United States Patent [19]

Staley

[11] 4,375,653

[45] Mar. 1, 1983

[54] CAMERA MOUNT

[75] Inventor: Darrell S. Staley, Cupertino, Calif.

[73] Assignee: Ampex Corporation, Redwood City, Calif.

[21] Appl. No.: 252,757

[22] Filed: Apr. 10, 1981

[51] Int. Cl.$^3$ ............................................. H04N 5/30
[52] U.S. Cl. .................................... 358/229; 358/224
[58] Field of Search ....................... 358/229, 224, 217

[56] References Cited

U.S. PATENT DOCUMENTS

| | | | |
|---|---|---|---|
| 3,845,238 | 10/1974 | Schneider et al. | 358/229 |
| 4,008,372 | 12/1977 | Ueno et al. | 358/229 |
| 4,161,754 | 7/1979 | Leeson et al. | 358/229 |

*Primary Examiner*—Richard Murray
*Attorney, Agent, or Firm*—Charles M. Carman, Jr.; Joel D. Talcott

[57] ABSTRACT

This invention is a mount to fit a portable camera for studio use. The mount has a vertical front plate to the rear side of which the front of the complete camera (less lens) is attached, without the need for any disassembly. From the front of the plate the studio lenses extend. A horizontal bottom plate extends from the lower rear portion of the front plate for attaching the mount to a standard tripod, or other base. A protective grille-cage assembly extends from the front and bottom plates to generally enclose the space to be occupied by the camera. Equipment particular to studio use is contained in a pair of side pods that are hinged to the grille members so as to be swung outwardly and downwardly for access to the camera. A studio view-finder and monitor is attached to various rearward grille members and is vertically adjustable by means of vertical racks formed on the grille members and manually conjointly operable through pinions contained in the view-finder and monitor assembly.

11 Claims, 6 Drawing Figures

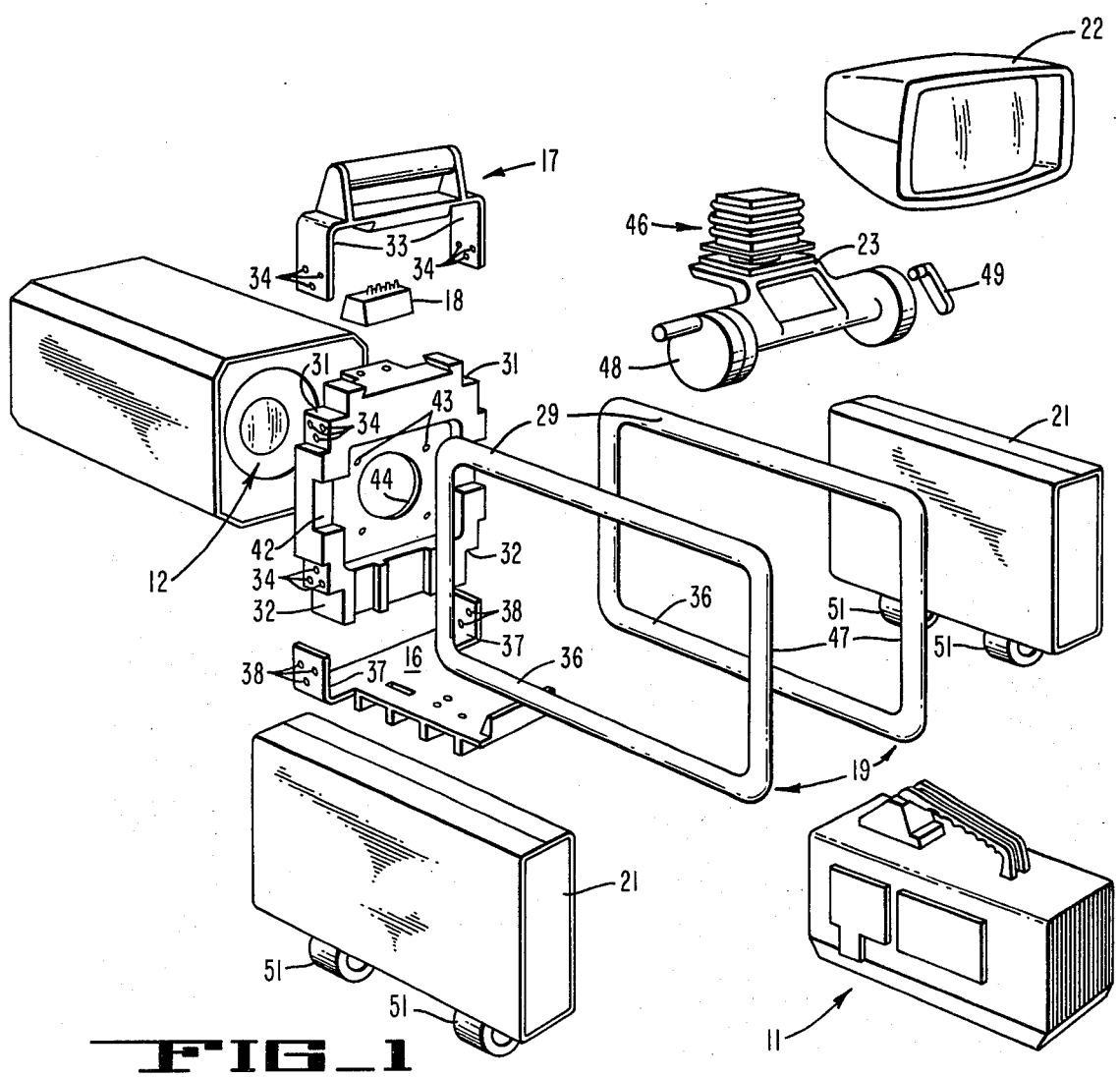
FIG_1
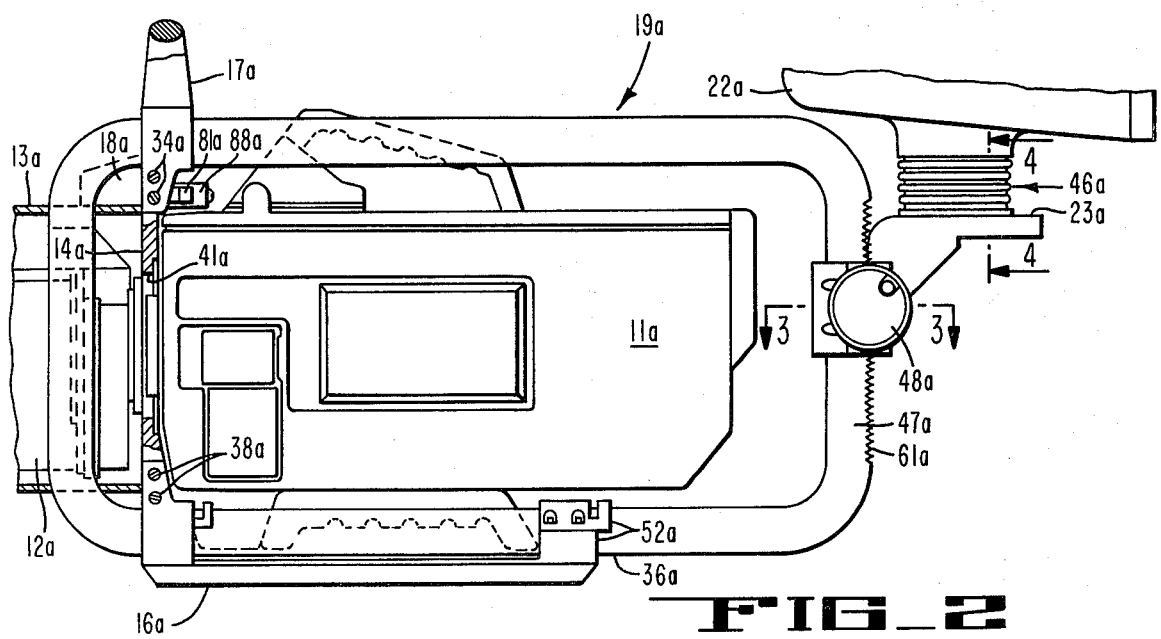
FIG_2

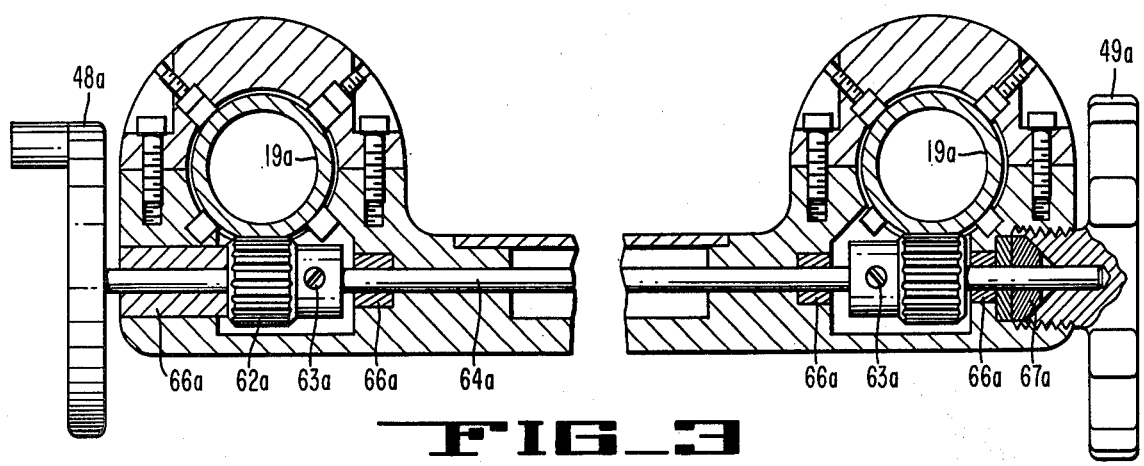
FIG_3
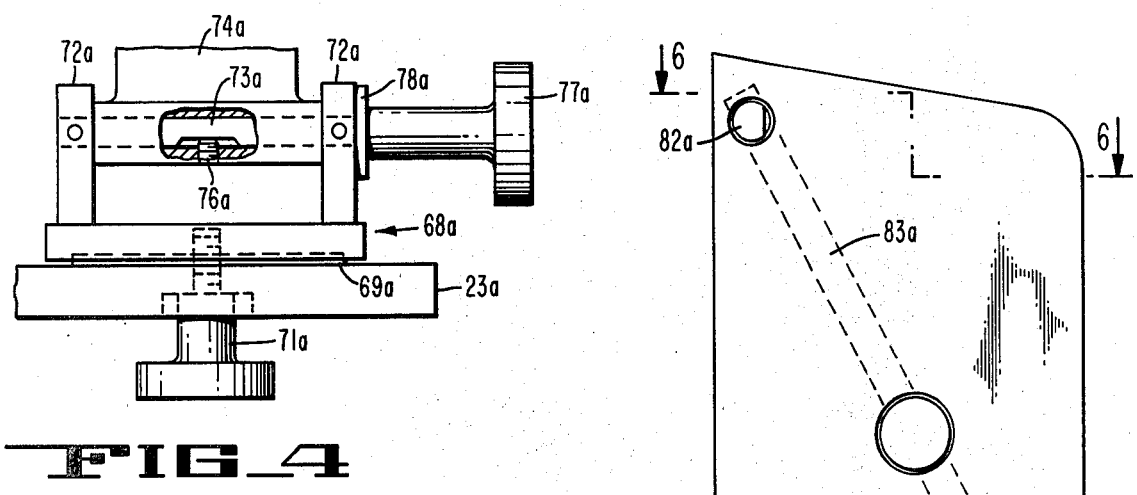
FIG_4
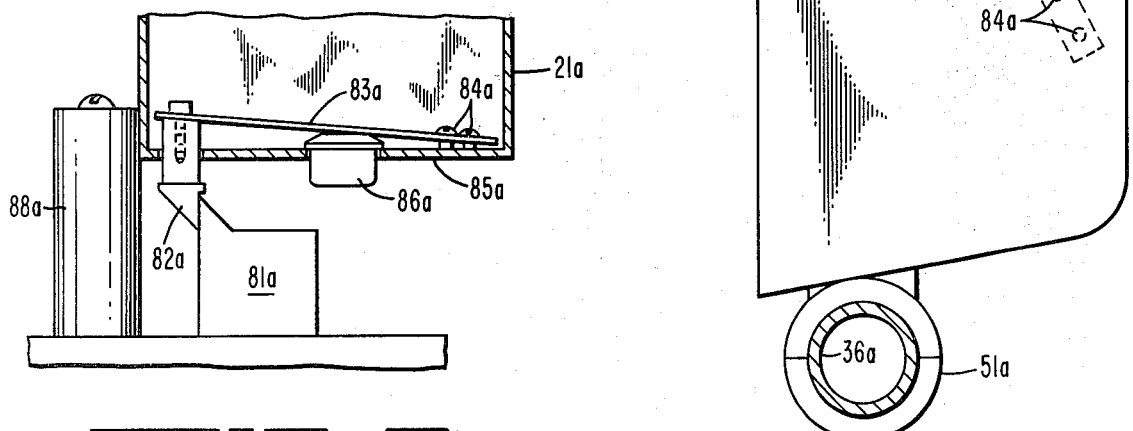
FIG_6
FIG_5

4,375,653

CAMERA MOUNT

BACKGROUND OF THE INVENTION

This invention relates to camera mounts, and particularly to mounts adapting portable cameras for studio use.

In the news-gathering industry, and particularly in that portion concerned with television coverage of news and the making of documentary television productions, use is generally made of small, light-weight television cameras in conjuction with magnetic tape television recorders, the cameras having interchangeable lenses and view-finder assemblies. Television studio cameras, on the other hand, generally require much larger camera, view-finder and lens assemblies than can be adapted for portability.

To avoid having two complete arrays of portable and studio cameras, which would occasion much duplication, it has been attempted to develop portable cameras that can be adapted to studio use by mounting them on massive mounts suitable for carrying the more elaborate attachments needed in the studio.

Prior to the present invention, such adapting mounts have required not only the removal of the lens system, which would have to be removed in any case if a larger lens is to be used, but also the substantial dis-assembly of both the camera and the mount itself. Furthermore, it has usually also been the custom to enclose the portable camera entirely within a larger housing, partly for protection, and partly for cosmetic reasons.

Accordingly, it is an object of the present invention to provide a studio mount for a portable camera, which requires no dis-assembly of either the camera or the mount in fitting the former to the latter.

It is another object of the invention to provide a mount as above described and providing open and ready access to the camera without the sacrifice of protection for the camera in its mount.

SUMMARY OF THE INVENTION

These and other objects are accomplished in the present invention, which provides a mount to fit a portable camera for studio use. The mount has a vertical front plate to the rear side of which the front of the complete camera (less lens) is attached, without the need for any disassembly. From the front of the plate the studio lenses extend. A horizontal bottom plate extends from the lower rear portion of the front plate for attaching the mount to a standard tripod, or other base. A protective grille-cage assembly extends from the front and bottom plates to generally enclose the space to be occupied by the camera. Equipment particular to studio use in contained in a pair of side pods that are hinged to the grille members so as to be swung outwardly and downwardly for access to the camera. A studio view-finder and monitor is attached to various rearward grille members and is vertically adjustable by means of vertical racks formed on the grille members and manually conjointly operable through pinions contained in the view-finder and monitor assembly.

DESCRIPTION OF THE DRAWINGS

FIG. 1 is an exploded perspective view showing the mount of the present invention and the portable camera to be mounted thereon;

FIG. 2 is a right side elevational view, partly fragmented, and to a larger scale, showing a mount according to the invention and having parts analogous to those of FIG. 1 except that the side pods are omitted for the sake of clarity;

FIG. 3 is an enlarged cross-sectional and fragmentary plan view taken along the plane of line 3—3 of FIG. 2;

FIG. 4 is a cross-sectional elevation view taken along the plane of lines 4—4 of FIG. 2;

FIG. 5 is an enlarged elevational end view of a side pod analogous to those of FIG. 1, but adapted for the apparatus of FIG. 2; and FIG. 6 is a fragmentary cross-sectional plan view showing the latching mechanism of the side pod of FIG. 5 and portions of the apparatus of FIG. 2.

DESCRIPTION OF THE PREFERRED EMBODIMENTS

Referring now to FIG. 1, there is shown a portable magnetic tape television camera 11, a studio lens 12 and lens housing 13, and portions of a studio mount therefor including: a camera front mounting plate 14; a bottom plate 16; a handle 17; a cueing lamp 18; a pair of quadrilateral (e.g., rectagular) grille members 19 formed of bent hollow tubing; a pair of apparatus containing side pods 21; a view-finder and monitor assembly 22; and a horizontal support plate 23 therefor.

Imploding the parts of the mount for assembly thereof, it will be seen that the upper runs 29 of grille members 19 are fitted into a pair of "demi-clamp" recesses 31 and 32 on the front plate 14, and then the handle member 17, which is formed to define a pair of demi-clamp recesses 33, is fitted over the assembly so as to completely enclose the members 19 between the demi-clamps 31, 33. The handle 17 is then secured to plate 14 by means of bolts (not shown) threaded into bolt holes 34.

Similarly, the lower runs 36 of the grille members 19 are clamped between demi-clamps 32 and 37 of bottom plate 16, which is bolted to plate 14 by means of bolts (not shown) in bolt holes 38.

Now it will be seen that the grille members 19 each define a rectangle larger than the lateral silhouette of the camera 11, so that when the camera is mounted on front plate 14, the grille members 19 form a protective cage around the camera, without inhibiting access to it.

The grille members 19 are also useful as handles for the moving and positioning of the camera on its mount.

The mounting of the illustrated camera 11 to the front plate 14 is quite simple. The lens 12 is arranged to screw on to the front portion of camera 11, and an opening 41 is provided in the front plate 14, through which the lens 12 and camera 11 are screwed together, so as to clamp themselves to plate 14. The lens cover or housing 13 is supported by the lens assembly 12.

Cameras, lenses and lens covers of differing designs may be accomodated by adapting the front plate 14 to have corresponding openings 41, relieved portions 42, bolt holes 43 and other attaching and fastening features, all according to the particularities of the camera and lens designs.

The view-finder supporting plate 23 illustrated in FIG. 1 is attached to the view-finder through a tilting and swiveling mechanism 46, best described in relation to the analogous mechanism 46a of FIG. 2; and the plate 23 is elevated, or depressed, and stabilized on the rearward vertical runs 47 of the grilles 19, as by means of a hand wheel 48 and clamp means 49, also best described in relation to analogous elements 48a and 49a of FIGS. 2 and 3.

Also shown in FIG. 1 is a pair of side pods 21 containing various electronic circuits and other apparatus required for studio use of the camera. Each of the pods 21 has a pair of knuckle rings 51 extending from the bottom thereof and serving to enclasp the lower run 36 of the corresponding grille member 19 so as to permit outward and downward hinged pivoting of the pod to permit access to the mounted camera. Latching means are also provided as described in connection with FIGS. 2, 5 and 6 below.

Referring now to FIG. 2, there is shown a mount having portions of slightly different outward appearence but of analogous function, each of those parts being designated by an "a" appended to the reference numeral of its counterpart in FIG. 1, e.g., part 14a, the front plate in FIG. 2, corresponds in function with the front plate 14 of FIG. 1. The view of FIG. 2 is taken of the apparatus with the side pods 21a removed, and one of these pods is shown in FIGS. 5 and 6. Also, bottom plate 16a differs from its counterpart 16 in having an extra pair of clamps 52a at the rear portion of the plate for attaching to lower runs 36a for extra strength of the assembly.

It will especially noted in FIG. 2 how the grille members 47a are formed rectangularly to define a larger area than the lateral silhouette of the camera 11a, thus to operate more effectively as a protection to the camera.

In order to provide more effectively for precisely controlled elevation and depression of the view-finder, a toothed vertical rack 61a is provided on each of the rearward vertical runs 47a of the grille members 19a, and a pair of pinion gears 62a (FIG. 3) are mounted by keys 63a to a common shaft 64a mounted in bushings 66a and controlled by handwheel 48a. Thus, operation of the handwheel 48a moves the view-finder up or down on both racks 61a concurrently, and no binding or jamming can occur. To lock the view-finder at a desired elevation, a clamping handwheel 49a is threaded into the base of member 23a, and when moved inwardly, compresses and radially expands a flexible split ring 67a to lock the shaft 64a in position.

Since the view-finder 22 exhibits a framed "picture" that is taken through the camera 11a and its lens 12a and electronically reproduced on the viewfinder screen, it does not need to be pointed in the same direction as the camera, and for operator convenience it is desirable to adapt the viewfinder for tilting and swiveling action.

Accordingly, on the plate 23a, there is mounted a bracket 68a, having a compressible friction pad 69a therebetween, and a swivel clamp pin 71a passes through the plate 23a and is threaded into the bracket in position. A pair of rtunnions 72a support a shaft 73a for rotation on a horizontal axis, and the base 74a of the viewfinder 22a is keyed to the shaft by key 76a between the trunnions. On an extension of the shaft 73a is threaded a locking knob 77a, which bears against the adjacent trunnion 72a through a compressible friction pad 78a to lock the viewfinder in a desired tilted position.

FIGS. 5 and 6 show how each of the side pads 21a is mounted by means of the knuckle rings 51a to the lower runs 36a of the grille members 19a. A latching mechanism is also provided. It includes a strike plate 81a (FIG. 6) which is mounted on the rear face of front plate 14a and is engaged in the closed position by a latching bolt 82a mounted on and spring loaded by a leaf spring 83a which in turn is mounted by bolts 84a to the inside of wall 85a of the pad. A latch release button 86a is mounted in the wall 85a to bear against spring 83a and is manually operable to move the sping and bolt 82a to clear the strike plate 81a. A post 88a, having a resilient covering, is also mounted on the rear face of front plate 14a to act as a closing stop for the pad.

I claim:

1. A studio mount for a portable camera of the type having a lens assembly detachably mounted thereon, and an associated view-finder, characterized in the provision of:

a camera attachment assembly adapted for mounting said camera and lens assembly complete thereon;
    said attachment assembly also being adapted for attachment to a base assembly; and
    a protective grille assembly mounted on said attachment assembly and defining a cage extending generally around the space that is occupied by said camera when mounted;
    said cage grille assembly having mutually supporting and strengthening connections with said attachment assembly and with said view-finder.

2. A studio mount as described in claim 1, wherein said attachment assembly comprises:

a camera front mounting plate adapted for mounting said camera complete on a rear side thereof; and
    a bottom plate adapted for attachment to said front mounting plate and for attachment to said base assembly.

3. A studio mount as described in claim 2, and further characterized in that:

front handle means are provided for attachment to said front plate so as to extend above said front plate.

4. A studio mount for a portable camera of the type having a lens assembly detachably mounted thereon, and an associated view-finder, characterized in the provision of:

a camera attachment assembly adapted for mounting said camera and lens assembly complete thereon;
    said attachment assembly also being adapted for attachment to a base assembly;
    a protective grille assembly mounted on said attachment assembly and defining a cage extending generally around the space that is occupied by said camera when mounted;
    said attachment assembly comprising a camera front mounting plate adapted for mounting said camera complete on a rear side thereof, and a bottom plate adapted for attachment to said front mounting plate and for attachment to said base assembly; and
    said grille cage assembly including a pair of grille members each comprising a tube element formed into an endless loop of quadrilateral shape larger than the lateral silhouette of said camera and adapted for mutually supporting and strengthening attachment in a vertical plane to the assembly of said front and bottom plates on one of the lateral sides thereof to define, with the other cage member, said protective grille cage assembly for said camera;
    said grille cage assembly also having mutually supporting and strengthening connections with said view-finder.

5. A mount as described in claim 4, wherein:

a pair of generally flat, box-like side pods are mounted on said tube elements to form lateral sides for said cage assembly;

said pods being adapted for containing apparatus for use with said camera in a studio environment;

each of said pods having a pair of ring-like hinge members mounted on the bottom portion thereof and enclasping the lower run of the adjacent tube element for pivoting of said pod outwardly and downwardly for access to said camera;

each of said pods also having a manually-disengageable automatic latching mechanism for holding said pod in vertical closed position when access to said camera is not required.

6. A studio mount for a portable camera of the type having a lens assembly detachably mounted thereon, and an associated view-finder, characterized in the provision of:

a camera attachment assembly adapted for mounting said camera and lens assembly complete thereon;

said attachment assembly also being adapted for attachment to a base assembly;

a protective grille assembly mounted on said attachment assembly and defining a cage extending generally around the space that is occupied by said camera when mounted;

said attachment assembly comprising a camera front mounting plate adapted for mounting said camera complete on a rear side thereof, and a bottom plate adapted for attachment to said front mounting plate and for attachment to said base assembly;

said grille cage assembly including a pair of grille members each comprising a tube element formed into an endless loop of quadrilateral shape larger than the lateral silhouette of said camera and adapted for attachment in a vertical plane to the assembly of said front and bottom plates on one of the lateral sides thereof to define, with the other cage member, said protective grille cage assembly for said camera; and front handle means attached to said front plate so as to extend above said plate and shaped to define a first demi-clamp for each of the front upper runs of said grille members, said front mounting plate being accordingly shaped to define a pair of second demi-clamps for said upper runs and said first and second demi-clamps being arranged to define two complete clamps for said respective runs;

whereby when said front plate, front handle means and said grille cage assemblies are assembled, all provide mutual support and rigidity for one another and for the mount;

said grille cage assembly also having mutually supporting and strengthening connections with said view-finder.

7. A studio mount for a portable camera of the type having a lens assembly detachably mounted thereon, and an associated view-finder, characterized in the provision of:

a camera attachment assembly adapted for mounting said camera and lens assembly complete thereon;

said attachment assembly also being adapted for attachment to a base assembly;

a protective grille assembly mounted on said attachment assembly and defining a cage extending generally around the space that is occupied by said camera when mounted;

said attachment assembly comprising a camera front mounting plate adapted for mounting said camera complete on a rear side thereof, and a bottom plate adapted for attachment to said front mounting plate and for attachment to said base assembly;

said grille cage assembly including a pair of grille members each comprising a tube element formed into an endless loop of quadrilateral shape larger than the lateral silhouette of said camera and adapted for mutually supporting and strengthening attachment in a vertical plane to the assembly of said front and bottom plates on one of the lateral sides thereof to define, with the other cage member, said protective grille cage assembly for said camera;

a view-finder and monitor assembly including a horizontal support plate therefor;

a bracket attached to said support plate; and a horizontal pivot pin journalled on said bracket and also keyed to said view-finder and monitor in a vertical plane;

said bracket being provided with clamping means to lock said view-finder and monitor in a desired inclination in said vertical plane;

said support plate extending between said tube elements for support of said view-finder and monitor assembly and for lateral strengthening of said grille cage assembly.

8. A mount as described in claim 7, wherein said bracket is attached to said support plate as by means of a clamping screw having a manually-operable handle beneath said support plate and a threaded portion extending verticaly freely through said support plate and threaded into said bracket to permit swiveling of said bracket in a horizontal plane and locking of said bracket to said support plate in a chosen azimuth with respect to said support plate.

9. A mount as described in claim 8 wherein said tube elements each have a generally vertical rearward run, and said support plate extends between said rearward runs and has sliding journal portions enclosing each of said rearward runs for vertical sliding movement of said view-finder and monitor assembly.

10. A mount as described in claim 9, wherein said rear runs each have a toothed rack formed vertically thereon, and a pair of manually-operable toothed pinions are rotatably carried by said support plate for engaging both of said racks to adjust the elevation of said view-finder and monitor assembly.

11. A mount as described in claim 10, wherein a manually operable handle is provided on said pinion adjacent one of said rear runs, and manually operable clamping means are provided on said plate adjacent the other of said rear runs for locking said view-finder and monitor assembly in a chosen elevational position.

* * * * *